United States Patent
Jones et al.

(10) Patent No.: US 6,629,154 B1
(45) Date of Patent: *Sep. 30, 2003

(54) METHOD AND SYSTEM FOR DETERMINISTIC HASHES TO IDENTIFY REMOTE METHODS

(75) Inventors: Peter C. Jones, Winchester, MA (US); Ann M. Wollrath, Groton, MA (US); Robert W. Scheifler, Somerville, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 139 days.

This patent is subject to a terminal disclaimer.

(21) Appl. No.: 09/688,029

(22) Filed: Oct. 12, 2000

Related U.S. Application Data

(63) Continuation of application No. 09/045,652, filed on Mar. 20, 1998, now Pat. No. 6,134,603.
(60) Provisional application No. 60/076,048, filed on Feb. 26, 1998.

(51) Int. Cl.[7] .............................................. G06F 13/00
(52) U.S. Cl. ...................................... 709/330; 709/203
(58) Field of Search ................................ 709/330, 203

(56) References Cited

U.S. PATENT DOCUMENTS

| | | | |
|---|---|---|---|
| 4,430,699 A | 2/1984 | Segarra et al. | 709/230 |
| 4,491,946 A | 1/1985 | Kryskow, Jr. et al. | 370/453 |
| 4,558,413 A | 12/1985 | Schmidt et al. | 707/203 |
| 4,567,359 A | 1/1986 | Lockwood | 235/381 |
| 4,713,806 A | 12/1987 | Oberlander et al. | 370/358 |
| 4,809,160 A | 2/1989 | Mahon et al. | 713/200 |
| 4,823,122 A | 4/1989 | Mann et al. | 340/825.28 |
| 4,939,638 A | 7/1990 | Stephenson et al. | 710/224 |
| 4,956,773 A | 9/1990 | Saito et al. | 717/104 |
| 4,992,940 A | 2/1991 | Dworkin | 705/26 |

(List continued on next page.)

FOREIGN PATENT DOCUMENTS

| | | |
|---|---|---|
| EP | 0 300 516 A | 1/1989 |
| EP | 0 351 536 A3 | 1/1990 |
| EP | 0 384 339 A | 8/1990 |

(List continued on next page.)

OTHER PUBLICATIONS

Osborn, "The Role of Polymorphism in Schema Evolution in an Object–Oriented Database," IEEE Transactions on Knowledge and Data Engineering, vol. 1, No. 3, Sep. 1989, pp. 310–317.

(List continued on next page.)

*Primary Examiner*—Kenneth R. Coulter
(74) *Attorney, Agent, or Firm*—Finnegan, Henderson, Farabow, Garrett & Dunner, L.L.P.

(57) ABSTRACT

A method and system is provided to uniquely identify a remote method to invoke on a server using a hash value computed from the method signature sent from the client to the server with the call request. When a client wishes to invoke a remote method located on a server, the client sends a hash value identifying the remote method to the server in the "remote method invocation" (RMI) call. In one implementation, this hash value is created by applying a hash function to the method string name and the parameter type list and possibly the return type. When the server receives the RMI call, the server identifies which method is being called using the received hash value. The server maintains a mapping of hash values to their associated remote methods located on the server and references the correct method using the hash value. Additionally, in one implementation, the server creates the mapping table dynamically when a remote object is created. The server identifies the methods implemented by the object and creates hash values for each method. These hash values are stored in a mapping table which is used to reference the remote methods.

14 Claims, 6 Drawing Sheets

U.S. PATENT DOCUMENTS

| | | |
|---|---|---|
| 5,109,486 A | 4/1992 | Seymour .................... 709/224 |
| 5,218,699 A | 6/1993 | Brandle et al. ............. 709/328 |
| 5,253,165 A | 10/1993 | Leiseca et al. ................. 705/5 |
| 5,297,283 A | 3/1994 | Kelly et al. .................. 709/104 |
| 5,307,490 A | 4/1994 | Davidson et al. ........... 709/328 |
| 5,311,591 A | 5/1994 | Fischer ....................... 713/156 |
| 5,319,542 A | 6/1994 | King, Jr. et al. .............. 705/27 |
| 5,327,559 A | 7/1994 | Priven et al. |
| 5,339,435 A | 8/1994 | Lubkin et al. .............. 717/121 |
| 5,386,568 A | 1/1995 | Wold et al. ................. 717/162 |
| 5,390,328 A | 2/1995 | Frey et al. .................. 709/315 |
| 5,392,280 A | 2/1995 | Zheng ........................ 370/353 |
| 5,423,042 A | 6/1995 | Jalili et al. .................. 709/328 |
| 5,440,744 A | 8/1995 | Jacobson et al. ........... 709/203 |
| 5,448,740 A | 9/1995 | Kiri et al. ................... 717/155 |
| 5,452,459 A | 9/1995 | Drury et al. ................... 707/3 |
| 5,455,952 A | 10/1995 | Gjovaag ..................... 717/108 |
| 5,471,629 A | 11/1995 | Risch ......................... 707/201 |
| 5,475,792 A | 12/1995 | Stanford et al. ............ 704/233 |
| 5,475,817 A | 12/1995 | Waldo et al. ............... 709/316 |
| 5,475,840 A | 12/1995 | Nelson et al. .............. 709/331 |
| 5,481,721 A | 1/1996 | Serlet et al. ................ 709/315 |
| 5,504,921 A | 4/1996 | Dev et al. ................... 709/223 |
| 5,511,196 A | 4/1996 | Shackelford et al. ....... 709/315 |
| 5,511,197 A | 4/1996 | Hill et al. ................... 709/328 |
| 5,524,244 A | 6/1996 | Robinson et al. ........... 717/140 |
| 5,544,040 A | 8/1996 | Gerbaulet .................... 705/26 |
| 5,548,726 A | 8/1996 | Pettus ......................... 709/221 |
| 5,553,282 A | 9/1996 | Parrish et al. ............... 707/10 |
| 5,555,367 A | 9/1996 | Premerlani et al. ........... 707/4 |
| 5,555,427 A | 9/1996 | Aoe et al. ................... 709/201 |
| 5,577,231 A | 11/1996 | Scalzi et al. ................ 703/26 |
| 5,592,375 A | 1/1997 | Salmon et al. ................ 705/7 |
| 5,594,921 A | 1/1997 | Pettus ......................... 710/11 |
| 5,617,537 A | 4/1997 | Yamada et al. ............. 709/204 |
| 5,628,005 A | 5/1997 | Hurvig .......................... 707/8 |
| 5,644,768 A | 7/1997 | Periwal et al. .............. 709/102 |
| 5,652,888 A | 7/1997 | Burgess ...................... 709/318 |
| 5,664,110 A | 9/1997 | Green et al. .................. 705/26 |
| 5,664,111 A | 9/1997 | Nahan et al. ................. 705/27 |
| 5,666,493 A | 9/1997 | Wojcik et al. ............... 705/26 |
| 5,671,225 A | 9/1997 | Hooper et al. .............. 370/468 |
| 5,671,279 A | 9/1997 | Elgamal ....................... 705/79 |
| 5,675,796 A | 10/1997 | Hodges et al. .............. 709/100 |
| 5,675,797 A | 10/1997 | Chung et al. ............... 709/104 |
| 5,680,573 A | 10/1997 | Rubin et al. ................ 711/129 |
| 5,680,617 A | 10/1997 | Gough et al. ............ 707/104.1 |
| 5,684,955 A | 11/1997 | Meyer et al. ............... 709/316 |
| 5,689,709 A | 11/1997 | Corbett et al. .............. 709/315 |
| 5,694,551 A | 12/1997 | Doyle et al. ................. 705/26 |
| 5,706,435 A | 1/1998 | Barbara et al. .............. 711/141 |
| 5,706,502 A | 1/1998 | Foley et al. .................. 707/10 |
| 5,710,887 A | 1/1998 | Chelliah et al. ............. 705/26 |
| 5,715,314 A | 2/1998 | Payne et al. .................. 705/78 |
| 5,721,832 A | 2/1998 | Westrope et al. ............ 705/27 |
| 5,724,540 A | 3/1998 | Kametani |
| 5,724,588 A | 3/1998 | Hill et al. .................... 709/328 |
| 5,727,048 A | 3/1998 | Hiroshima et al. ....... 379/93.12 |
| 5,727,145 A | 3/1998 | Nessett et al. .............. 713/200 |
| 5,729,594 A | 3/1998 | Klingman ................ 379/93.12 |
| 5,737,607 A | 4/1998 | Hamilton et al. ........... 709/316 |
| 5,742,768 A | 4/1998 | Gennaro et al. |
| 5,745,678 A | 4/1998 | Herzberg et al. ........... 713/200 |
| 5,745,695 A | 4/1998 | Gilchrist et al. ............ 709/227 |
| 5,745,703 A | 4/1998 | Cejtin et al. ................ 709/238 |
| 5,745,755 A | 4/1998 | Covey ........................ 707/203 |
| 5,748,897 A | 5/1998 | Katiyar ....................... 709/219 |
| 5,754,849 A | 5/1998 | Dyer et al. .................. 707/101 |
| 5,757,925 A | 5/1998 | Faybishenko ............... 709/203 |
| 5,758,328 A | 5/1998 | Giovannoli ................... 705/26 |
| 5,758,344 A | 5/1998 | Prasad et al. .................. 707/10 |
| 5,761,656 A | 6/1998 | Ben-Shachar .................. 707/4 |
| 5,764,897 A | 6/1998 | Khalidi ....................... 709/201 |
| 5,774,551 A | 6/1998 | Wu et al. .................... 713/155 |
| 5,774,729 A | 6/1998 | Carney et al. |
| 5,778,179 A | 7/1998 | Kanai et al. ................ 709/203 |
| 5,778,187 A | 7/1998 | Monteiro et al. ........... 709/231 |
| 5,778,228 A | 7/1998 | Wei ............................ 709/328 |
| 5,778,368 A | 7/1998 | Hogan et al. ................. 707/10 |
| 5,784,560 A | 7/1998 | Kingdon et al. ............ 709/201 |
| 5,787,425 A | 7/1998 | Bigus ............................ 707/6 |
| 5,787,431 A | 7/1998 | Shaughnessy ............... 707/100 |
| 5,790,548 A | 8/1998 | Sistanizadeh et al. ....... 370/401 |
| 5,790,677 A | 8/1998 | Fox et al. ..................... 705/78 |
| 5,794,207 A | 8/1998 | Walker et al. .................. 705/1 |
| 5,802,367 A | 9/1998 | Held et al. .................. 709/332 |
| 5,805,805 A | 9/1998 | Civanlar et al. ............ 709/220 |
| 5,808,911 A | 9/1998 | Tucker et al. ............... 709/316 |
| 5,809,144 A | 9/1998 | Sirbu et al. ................... 705/53 |
| 5,809,507 A | 9/1998 | Cavanaugh, III ....... 707/103 R |
| 5,812,819 A | 9/1998 | Rodwin et al. ............... 703/23 |
| 5,813,013 A | 9/1998 | Shakib et al. ............... 707/102 |
| 5,815,149 A | 9/1998 | Mutschler, III et al. .... 345/762 |
| 5,815,711 A | 9/1998 | Sakamoto et al. .......... 717/105 |
| 5,818,448 A | 10/1998 | Katiyar ....................... 709/203 |
| 5,829,022 A | 10/1998 | Watanabe et al. ........... 711/118 |
| 5,832,219 A | 11/1998 | Pettus ......................... 709/203 |
| 5,832,529 A | 11/1998 | Wollrath et al. ............ 707/206 |
| 5,832,593 A | 11/1998 | Wurst et al. .................. 29/750 |
| 5,835,737 A | 11/1998 | Sand et al. .................. 710/113 |
| 5,844,553 A | 12/1998 | Hao et al. ................... 345/733 |
| 5,845,090 A | 12/1998 | Collins, III et al. ........ 709/221 |
| 5,845,129 A | 12/1998 | Wendorf et al. ............ 710/200 |
| 5,850,442 A | 12/1998 | Muftic ......................... 705/65 |
| 5,860,004 A | 1/1999 | Fowlow et al. ............. 717/109 |
| 5,864,862 A | 1/1999 | Kriens et al. ............ 707/103 R |
| 5,864,866 A | 1/1999 | Henckel et al. ......... 707/103 R |
| 5,872,928 A | 2/1999 | Lewis et al. ................ 709/222 |
| 5,872,973 A | 2/1999 | Mitchell et al. ............ 709/332 |
| 5,875,335 A | 2/1999 | Beard ......................... 717/139 |
| 5,878,411 A | 3/1999 | Burroughs et al. ............ 707/4 |
| 5,884,024 A | 3/1999 | Lim et al. ................... 713/201 |
| 5,884,079 A | 3/1999 | Furusawa ................... 717/109 |
| 5,887,134 A | 3/1999 | Ebrahim ..................... 709/200 |
| 5,889,951 A | 3/1999 | Lombardi |
| 5,890,158 A | 3/1999 | House et al. .................. 707/10 |
| 5,892,904 A | 4/1999 | Atkinson et al. ........... 713/201 |
| 5,913,029 A | 6/1999 | Shostak ...................... 709/203 |
| 5,933,497 A | 8/1999 | Beetcher et al. .............. 705/59 |
| 5,933,647 A | 8/1999 | Aronberg et al. ........... 717/178 |
| 5,935,249 A | 8/1999 | Stern et al. .................. 713/201 |
| 5,940,827 A | 8/1999 | Hapner et al. .................. 707/8 |
| 5,944,793 A | 8/1999 | Islam et al. ................. 709/220 |
| 5,946,485 A | 8/1999 | Weeren et al. .............. 717/109 |
| 5,946,694 A | 8/1999 | Copeland et al. ....... 707/103 R |
| 5,949,998 A | 9/1999 | Fowlow et al. ............. 717/105 |
| 5,951,652 A | 9/1999 | Ingrassia, Jr. et al. ...... 709/248 |
| 5,956,509 A | 9/1999 | Kevner ....................... 709/330 |
| 5,961,582 A | 10/1999 | Gaines |
| 5,963,924 A | 10/1999 | Williams et al. .............. 705/40 |
| 5,963,947 A | 10/1999 | Ford et al. .................... 707/10 |
| 5,966,531 A | 10/1999 | Skeen et al. ................ 709/315 |
| 5,969,967 A | 10/1999 | Aahlad et al. ................. 700/2 |
| 5,974,201 A | 10/1999 | Chang et al. ............... 382/305 |
| 5,978,484 A | 11/1999 | Apperson et al. ............ 705/54 |
| 5,982,773 A | 11/1999 | Nishimura et al. ..... 370/395.53 |
| 5,987,506 A | 11/1999 | Carter et al. ................ 709/213 |
| 5,999,179 A | 12/1999 | Kekic et al. ................ 345/734 |
| 5,999,988 A | 12/1999 | Pelegri-Llopart et al. ... 709/330 |
| 6,003,050 A | 12/1999 | Silver et al. |
| 6,003,763 A | 12/1999 | Gallagher et al. ........... 235/379 |

| | | | |
|---|---|---|---|
| 6,009,103 A | 12/1999 | Woundy | 370/401 |
| 6,009,413 A | 12/1999 | Webber et al. | 705/26 |
| 6,016,496 A | 1/2000 | Roberson | 707/103 R |
| 6,016,516 A * | 1/2000 | Horikiri | 709/330 |
| 6,023,586 A | 2/2000 | Gaisford et al. | 717/178 |
| 6,026,414 A | 2/2000 | Anglin | 707/204 |
| 6,031,977 A | 2/2000 | Pettus | 709/230 |
| 6,032,151 A | 2/2000 | Arnold et al. | 707/103 R |
| 6,044,381 A * | 3/2000 | Boothby et al. | 707/201 |
| 6,052,761 A | 4/2000 | Hornung et al. | 711/141 |
| 6,058,383 A | 5/2000 | Narasimhalu et al. | 705/44 |
| 6,061,699 A | 5/2000 | DiCecco et al. | 707/513 |
| 6,061,713 A | 5/2000 | Bharadhwaj | 709/203 |
| 6,067,575 A | 5/2000 | McManis et al. | 709/313 |
| 6,085,255 A | 7/2000 | Vincent et al. | 709/238 |
| 6,093,216 A | 7/2000 | Adl-Tabatabai et al. | 717/128 |
| 6,108,346 A | 8/2000 | Doucette et al. | 370/450 |
| 6,134,603 A * | 10/2000 | Jones et al. | 709/330 |
| 6,182,083 B1 | 1/2001 | Scheifler et al. | 707/103 R |
| 6,185,602 B1 | 2/2001 | Bayrakeri | 709/204 |
| 6,185,611 B1 | 2/2001 | Waldo et al. | 709/221 |
| 6,199,116 B1 | 3/2001 | May et al. | 709/310 |
| 6,216,138 B1 | 4/2001 | Wells et al. | 707/502 |
| 6,216,158 B1 | 4/2001 | Luo et al. | 709/217 |
| 6,226,746 B1 | 5/2001 | Scheifler | 713/200 |
| 6,243,716 B1 | 6/2001 | Waldo et al. | 707/202 |
| 6,247,091 B1 | 6/2001 | Lovett | 710/260 |
| 6,253,256 B1 | 6/2001 | Wollrath et al. | |
| 6,263,350 B1 | 7/2001 | Wollrath et al. | |
| 6,263,379 B1 | 7/2001 | Atkinson et al. | 709/332 |
| 6,272,559 B1 | 8/2001 | Jones et al. | |
| 6,282,295 B1 | 8/2001 | Young et al. | 380/286 |
| 6,282,568 B1 | 8/2001 | Sondur et al. | 709/223 |
| 6,339,783 B1 * | 1/2002 | Horikiri | 709/203 |
| 6,343,308 B1 | 1/2002 | Marchesseault | |
| 6,385,643 B1 | 5/2002 | Jacobs et al. | |

FOREIGN PATENT DOCUMENTS

| | | |
|---|---|---|
| EP | 0 472 874 A1 | 3/1992 |
| EP | 497 022 A1 | 8/1992 |
| EP | 0 555 997 A | 8/1993 |
| EP | 0 565 849 A | 10/1993 |
| EP | 0 569 195 A2 | 11/1993 |
| EP | 0 625 750 A | 11/1994 |
| EP | 0 635 792 A | 1/1995 |
| EP | 0 651 328 A | 5/1995 |
| EP | 0 660 231 A | 6/1995 |
| EP | 0 697 655 A2 | 2/1996 |
| EP | 0 718 761 A | 6/1996 |
| EP | 0 767 432 A2 | 4/1997 |
| EP | 0 778 520 A2 | 6/1997 |
| EP | 0 803 811 A | 10/1997 |
| EP | 0 805 393 A2 | 11/1997 |
| EP | 0 810 524 A | 12/1997 |
| EP | 0 817 020 A | 1/1998 |
| EP | 0 817 022 A2 | 1/1998 |
| EP | 0 817 025 A | 1/1998 |
| EP | 0 836 140 A2 | 4/1998 |
| GB | 2 253 079 A | 8/1992 |
| GB | 2 262 825 A | 6/1993 |
| GB | 2 305 087 A | 3/1997 |
| JP | 11-45187 | 2/1999 |
| WO | WO92/07335 | 4/1992 |
| WO | WO92/09948 | 6/1992 |
| WO | WO93/25962 A1 | 12/1993 |
| WO | WO94/03855 | 2/1994 |
| WO | WO96/03692 A | 2/1996 |
| WO | WO96/10787 | 4/1996 |
| WO | WO96/18947 | 6/1996 |
| WO | WO96/24099 | 8/1996 |
| WO | WO98/02814 | 1/1998 |
| WO | WO98/04971 | 2/1998 |

OTHER PUBLICATIONS

Kolodner et al., "Atomic Garbage Collection: Managing a Stable Heap," ACM, 1989, pp. 15–25.

Aldrich et al., "Providing Easier Access to Remote Objects in Client–Server Systems," System Sciences, 1998, Proceedings of the 31st Hawaii Internat'l. Conference, Jan. 6–9, 1998, pp. 366–375.

Aldrich et al., "Providing Easier Access to Remote Objects in Distributed Systems," Calif. Institute of Technology, www.cs.caltech.edu%7Ejedi/paper/edipaper.html, Nov. 21, 1997.

Betz et al., "Interoperable Objects: Laying the Foundation for Distributed Object Computing," Dr. Dobb's Journal, vol. 19, No. 11, p. 18(13), Oct. 1994.

Birrell et al., "Network Objects," Operating Systems Review, 27(5), pop. 217–230, Dec. 1993.

Burns et al., "An Analytical Study of Opportunistic Lease Renewal," Distributed Computing Systems, 21st International Conference, pp. 146–153, Apr. 2000.

Dollimore et al., "The Design of a System for Distributing Shared Objects," The Computer Journal, No. 6, Cambridge, GB, Dec. 1991.

Fleisch et al., "High Performance Distributed Objects Using Distributed Shared Memory & Remote Method Invocation," System Sciences, 1998, Proceedings of the 31st Hawaii Internat'l. Conference, Jan. 6–9, 1998, pp. 574–578.

Guyennet et al., "A New Consistency Protocol Implemented in the CALIF System," IEEE, 1094–7256/97, pp. 82–87, 1997.

Guyennet et al., "Distributed Shared Memory Layer for Cooperative Work Applications," IEEE, 0742–1303/97, pp. 72–78, 1997.

Hoshi et al., "Allocation of the Cross–Connect Function in Leased Circuit Networks," 1992, ICC'92, conference record, Supercomm/ICC '92, A New World of Communications, IEEE International Conference, pp. 1408–1412.

IBM Technical Disclosure Bulletin, "Local Network Monitoring to Populate Access Agent Directory," vol. 36, No. 09A, pp. 403–405, Sep. 1993.

Jones et al., "Garbage Collection: Algorithms for Automatic Dynamic Memory Management," pp. 165–175, John Wiley & Sons, 1996.

McGrath, "Discovery and Its Discontents: Discovery Protocols for Ubiquitous Computing," presented at Center for Excellence in Space Data and Information Science, NASA Goddard Space Flight Center, Apr. 5, 2000.

MUX–Elektronik, Java 1.1 Interactive Course, www.lls.se/mux/javaic.html, 1995.

Stevenson, "Token–Based Consistency of Replicated Servers," IEEE, CH2686–4/89/0000/0179, pp. 179–183, 1989.

Venners, "Jini Technology, Out of the Box," JAVAWORLD, 'Online!', pp. 1–4, Dec. 1998.

Wollrath et al., "A Distributed Object Model for the Java (TM) System," USENIX Association, Conference on Object–Oriented Technologies and Systems, Jun. 17–21, 1996.

Yin et al., "Using Leases to Support Server Driven Consistency in Large–Systems," Computer Services Department, University of Texas at Austin, p. 285–294, May 26–28, 1998.

Yin et al., "Volume Leases for Consistency in Large–Scale Systems," IEEE Transactions on Knowledge & Data Engineering, vol. 11, No. 4, pp. 563–576, Jul./Aug. 1999.

"Consumers Can View, Share Picture On–Line as Kodak Picture Network Goes 'Live'," Business Wire, Aug. 25, 1997, pp. 18–19.

"Eden Project Proposal," Department of Computer Science, University of Washington, Oct. 1980, Technical Report #80–10–01, cover and Foreword.

"ISN Dataweb Sells Software, Hardware," Datamation, Apr. 1, 1996, p. 40.

"Kodak DC220 And DC260 Digital Cameras Are Shipping To Retailers Across The Country Cameras Are Optimized for USB Interface Supported in Windows 98," Business Wire, Jun. 24, 1998, pp. 42–44.

"Kodak demonstrates leadership across entire photographic category," M2 Preswire, Feb. 13, 1998, pp. 31–35.

"Kodak PhotoNet Online Makes It a Snap to Share Summer Photos," PR Newswire, Jul. 2, 1998, pp. 63–64.

"Kodak Picture Networks Sends Prints Home From the Holidays," Business Wire, Dec. 29, 1997, pp. 58–60.

"Photo processing made easy on the Internet; Storm Software and PictureVision team up with Konica Corp.," Business Wire, Feb. 22, 1996, pp. 3–4.

"Seeing your photos a whole new way," Business Wire, Dec. 12, 1996, pp. 9–10.

"Webwatch: MCI Announces Internet Access,", Boardwatch Magazine, Jan. 1995.

Administrator's Guide, Netscape Enterprise Server, Version 3.0, Netscape Communications Corp., 1998.

Almes et al., "Edmas: A Locally Distributed Mail System," Department of Computer Science, University of Washington, Technical Report 83–07–01, Jul. 7, 1983, Abstract & pp. 1–17.

Almes et al., "Research in Integrated Distributed Computing," Department of Computer Science, University of Washington, Oct. 1979, pp. 1–42.

Almes et al., "The Eden System: A Technical Review," Department of Computer Science, University of Washington, Technical Report 83–10–05, Oct. 1983, pp. 1–25.

Almes, "Integration and Distribution in the Eden System," Department of Computer Science, University of Washington, Technical Report 83–10–02, Jan. 19, 1983, pp. 1–18 & Abstract.

Almes, "The Evolution of the Eden Invocation Mechanism," Department of Computer Science, University of Washington, Technical Report 83–01–03, Jan. 19, 1983, pp. 1–14 & Abstract.

Arnold, Ken, "The Jini Architecture: Dynamic Services in a Flexible Network," Sun Microsystems, Inc., Proceedings of the 36th ACM IEEE Design Automation Conference, Jun. 1999, pp. 157–162.

Bandrowski, "Stores Without Doors: Kiosks Generate New Profits," Corporate Computing, Oct. 1992, pp. 193–195.

Begole et al., "Transparent Sharing of Java Applets: A Replicated Approach," Oct. 1997, pp. 55–65.

Black et al., "A Language for Distributed Programming," Department of Computer Science, University of Washington, Technical Report 86–02–03, Feb. 1986, p. 10.

Black et al., "Distribution and Abstract Types in Emerald," University of Washington, Technical Report No. 85–08–05, Aug. 1985, pp. 1–10.

Black et al., "Object Structure in the Emerald System," University of Washington, Technical Report 86–04–03, Apr. 1986, pp. 1–14.

Black et al., "The Eden Project: A Final Report," Department of Computer Science, University of Washington, Technical Report 86–11–01, Nov. 1986, pp. 1–28.

Black, "Supporting Distributed Applications: Experience with Eden," Department of Computer Science, University of Washington, Technical Report 85–03–02, Mar. 1985, pp. 1–21.

Black, "The Eden Programming Language," Department of Computer Science, FR–35, University of Washington, Technical Report 85–09–01, Sep. 1985 (Revised Dec. 1985), pp. 1–19.

Black, "The Eden Project: Overview and Experiences," Department of Computer Science, University of Washington, EUUG, Autumn '86 Conference Proceedings, Manchester, UK, Sep. 22–25, 1986, pp. 177–189.

Braine et al., "Object–Flow," 1997, pp. 418–419.

Bruno, "Working the Web," Data Communications, Apr. 1997, pp. 50–60.

Ciancarini et al., "Coordinating Distributed Applets and Shade/Java," Feb. 1998, pp. 130–138.

Cohen, "Electric Commerce," USC/Information Sciences Institute, Oct. 1989.

Conhaim, "Online shopping: a beginner's guide; includes related listing of videotex services," Link–Up, vol. 5, No. 6, p. 32, Nov. 1988.

Delcambre et al., "Simulation of the Object Flow Model: A Conceptual Modeling Language for Object–Driven Applications," 1993, pp. 216–225.

Design Project #2, Electronic Shopping at MIT, MIT Class 6.033 Handout 23, Massachusetts Institute of Technology, http://web.mit.edu/6.033/1995/handouts/html/h23/html, Spring 1995, pp. 1–6.

Ellsworth, "Boom Town," Internet World, Jun. 1995, pp. 33–35.

Estrin, "Inter–Organization Networks: Implications of Access Control Requirements for Interconnection Protocols," ACM, 1986, pp. 254–263.

Fleischer, "SkyMall's Supplier Network' Takes Flight", The Technology Magazine for Retail Executives, Apr. 1997.

Foley, "Managing Campus–Wide Information Systems: Issues and Problems," Capitalizing on Communication, ACM SIGUCCS XVII, 1989, pp. 169–174.

Fryxell, "eaasySABRE," Link–Up, May/Jun. 1996, pp. 10–11.

Gardner, "Kodak Follows Startup Into Online Photo Processing Business," Internet World, Sep. 8, 1997, pp. 5–6.

Gogan et al., "Open Market, Inc.: Managing in a Turbulent Environment," Harvard Business School Publishing, Aug. 29, 1996, pp. 1–30.

Goldberg et al., "Smalltalk–80—The Language and its Implementation," Xerox Palo Alto Research Center, 1983 (reprinted with corrections, Jul. 1985), pp. 1–720.

Hodges, Douglas, "Managing Object Lifetimes in OLE," Aug. 25, 1994, pp. 1–41.

Holman et al., "The Eden Shared Calendar System," Department of Computer Science, FR–35, University of Washington, Technical Report 85–05–02, Jun. 22, 1985, pp. 1–14.

Hsu, "Reimplementing Remote Procedure Calls," University of Washington, Thesis, Mar. 22, 1985, pp. 1–106.

Hutchinson, "Emerald: An Object–Based Language for Distributed Programming," a Dissertation, University of Washington, 1987, pp. 1–107.

Israel et al., "Authentication in Office System Internetworks," ACM Transactions on Office Information Systems, vol. 1, No. 3; Jul. 1983, pp. 193–210.

Jacob, "The Use of Distributed Objects and Dynamic Interfaces in a Wide–Area Transaction Environment," SIGCOMMn '95 Workshop on Middleware: Cambridge, Mass., Aug. 1995, pp. 1–3.

Jul et al., "Fine–Grained Mobility in the Emerald System," University of Washington, ACM Transactions on Computer Systems, vol. 6, No. 1, Feb. 1988, pp. 109–133.

Jul, "Object Mobility in a Distributed Object–Oriented System," a Dissertation, University of Washington, 1989, pp. 1–154 (1 page Vita).

Keller, "Smart Catalogs and Virtual Catalogs," Proceedings of the First USENIX Workshop of Electronic Commerce, USENIX Association, Jul. 11–12, 1995, pp. 125–131.

Klein et al., "Trade'ex: The Shock Exchange of the Computer Industry," Harvard Business School Publishing, 1996, pp. 1–14.

Kodak Photonet FAQ, PhotoNet Online, Jun. 14, 2002, pp. 1–3.

Koshizuka et al., "Window Real–Objects: A Distributed Shared Memory for Distributed Implementation of GUI Applications," Nov. 1993, pp. 237–247.

Kramer, "NetWatch; The AJC's Daily Online Guide; Get the picture: Kodak will send photos to Web," The Atlanta Journal and Constitution, Sec. Features, p. 08C, Jun. 5, 1997.

Krasner et al., "Smalltalk–80; Bits of History, Words of Advice," 1983, Xerox Corporation, pp. 1–344.

Lampson et al., "Authentication in Distribution Systems: Theory and Practice," ACM Transactions in Computer Systems, vol. 10, No. 4, Nov. 1992, pp. 265–310.

Lansky, "Without APS, Photo Life Goes on Via Internet," Photographic Trade News, Aug. 1996, pp. 19–23.

Lavana et al., "Executable Workflows: A Paradigm for Collaborative Design on the Internet," Jun. 1997, 6 pages.

Lewis, "Pacific Bell, MCI to Expand Internet Service," The New York Times, sec. D, col. 1 at 3, Mar. 28, 1995.

LightSurf Instant Imaging—Press Releases, "Kodak And LightSurf Collaborate On Kodak Picture Center Online," LifeSurf Technologies Inc., Jun. 14, 2002, pp. 1–3.

Louwerse et al., "Data Protection Aspects in an Integrated Hospital Information System," North–Holland Computers & Security 3, 1994, pp. 286–294.

McEnaney, "Point–and–Click Memory Sharing; Launches PhotoNet online digital photography and imaging services," Photographic Trade News, Sec. Pg. 23, Jan. 1997.

Miller, "Web posting as a photo processing option," USA Today, Section: Life, p. 17D, Dec. 13, 1996.

Morris et al., "Andrew: A Distributed Personal Computing Environment," Communications of the ACM, vol. 29, No. 3, Mar. 1986, pp. 184–201.

O'Mahony, "Security Considerations in a Network Management Environment," IEEE Network, May/Jun. 1994, pp. 12–17.

Oppen et al., "The Clearinghouse: A Decentralized Agent for Locating Names Objects in a Distributed Environment," ACM Transactions on Office Information Systems, vol. 1, No. 3, Jul. 1983, pp. 230–253.

Petersen, "New But Not Improved," Direct Magazine, Nov. 1995.

Press Release, "Sun Goes Live With The Kodak Picture Network," Sun Microsystems, Inc., Jun. 14, 2002, pp. 1–2.

Proceedings of the Eighth Symposium on Operating Systems Principles, Dec. 14–16, 1981, ACM, Special Interest Group on Operating Systems, Association for Computing Machinery, vol. 15, No. 5, Dec. 1981, ACM Order No. 534810.

Proudfoot, "Replects: Data Replication in the Eden System," Department of Computer Science, University of Washington, Technical Report No. TR–85–12–04, Dec. 1985, pp. 1–156.

Pu, "Replication and Nested Transaction in the Eden Distributed System," Doctoral Dissertation, University of Washington, Aug, 6, 1986, pp. 1–179 (1 page Vita).

Raeder, "Is there a Prodigy in your future?," Database Searcher, vol. 5, No. 6, p. 18.

Ramm et al., "Exu—A System for Secure Delegation of Authority on an Insecure Network," Ninth System Administration Conference, 1995 LISA IX, Sep. 17–22, 1995, pp. 89–93.

Satyanarayanan, "Integrating Security in a Large Distributed System," ACM Transactions on Computer Systems, vol. 7, No. 3, Aug. 1989, pp. 247–280.

Schroeder et al., "Experience with Grapevine: The Growth of a Distributed System," ACM Transactions on Computer Systems, vol. 2, No. 1, Feb. 1984, pp. 3–23.

Senn, "Capitalizing on Electronic Commerce: The Role of the Internet in Electronic Markets," Information Systems Management, Summer 1996, pp. 15–24.

Steinke, "Design Aspects of Access Control in a Knowledge Base System," Computers & Security, 10, 1991, pp. 612–625.

Stern, "Industry Net," Link–Up, Mar./Apr. 1995, p. 10.

Tanenbaum et al., "Distributed Operating Systems," Computing Surveys, vol. 17, No. 4, Dec. 1985, pp. 419–470.

The Wall Street Journal, "Barclays Is Opening An 'Electronic Mall' For Internet Shopping," Tech. & Health Section at B2, Jun. 1, 1995.

The Wall Street Journal, "Prodigy Plans to Announce Internet 'Electronic Mail'," Tech. Section at B5, Nov. 27, 1995.

Trehan et al., "Toolkit for Shared Hypermedia on a Distributed Object Oriented Architecture," 1993, pp. 1–8.

Trommer, "Thomas Unveils Online Purchasing Network—Eases Product Sourcing And Odering Through EDI," Electronic Buyers' News at 60, Dec. 11, 1995.

Van Den Berg et al., "Advanced Topics of a Computer Center Audit," North–Holland Computers & Security 3, 1984, pp. 171–185.

Van Der Lans, "Data Security in a Rational Database Environment," North–Holland Computers & Security 5, 1986, pp. 128–134.

Welz, "New Deals: A ripening Internet market, secure systems and digital currency are reshaping global commerce," Internet World, Jun. 1995, pp. 36–41.

Wobber et al., "Authentication in the Taos Operating System" ACM, 1993, pp. 256–269.

Wyatt, "Netscape Enterprise Server," Prima Publishing, 1996.

Alexander, et al., "Active Bridging", Proceedings of the ACM/SIGCOMM'97 Conference, Cannes, France, 9/97.

Anonymous: "Change–Notification Service for Shared Files", IBM Technical Disclosure Bulletin, vol. 36, No. 8, pp. 77–82, Aug. 1993, XP002108713, New York, US.

Anonymous: "Resource Preemption for Priority Scheduling." Nov. 1973. IBM Technical Disclosure Bulletin, vol. 16, No. 6, p. 1931 XP002109435 New York, US.

Beech et al., "Object Databases as Generalizations of Relational Databases," Computer Standards & Interfaces, vol. 13, Nos. 1/3, pp. 221–230, (Jan. 1991) Amsterdam, NL.

Bertino et al., "Object–Oriented Database Management Systems: Concepts and Issues," Computers, vol. 24, No. 4, pp. 33–47, (Apr. 1991), Los Alamitos, CA.

Betz, Mark; "Interoperable objects: laying the foundation for distributed object computing"; Dr. Dobb's Journal, vol. 19, No. 11, p. 18(13); (Oct. 1994).

Bevan, D.I., "An Efficient Reference Counting Solution To The Distributed Garbage Collection Problem", Parall Computing, NL, Elsevier Publishers, Amsterdam, vol. 9, No. 2, pp. 179–192, Jan. 1989.

Birrell et al., "Implementing Remote Procedure Calls", ACM Transactions on Computer Systems, vol. 2, No. 1, Feb. 1984, pp. 39–59.

Dave A et al: "Proxies, Application Interface, and Distributed Systems", Proceedings International Workshop on Object Orientation in Operating Systems, Sep. 24, 1992, pp. 212–220.

Deux O et al: "The 02 System" Communications of the Association for Computing Machinery, vol. 34, No. 10, Oct. 1, 1991, pp. 34–48.

Drexler, K. Eric, et al., "Incentive Engineering for Computational Resource Management," The Ecology of Computation, Elsevier Science Publishers B.V., 1988, pp. 231–266.

Droms, R., "RFC 1541 Dynamic Host Configuration Protocol", http:/www.cis.ohio–state.edu/htbin/rfc1541.html, Oct. 1993, pp. 1–33.

Emms J: "A Definition of an Access Control Systems Language" Computer Standards and Interfaces, vol. 6, No. 4, Jan. 1, 1987, pp. 443–454.

Gosling et al., "The Java (TM) Language Specification", Addison–Wesley, 1996.

Gottlob et al., "Extending Object–Oriented Systems with Roles," ACM Transactions on information systems, vol. 14, No. 3, pp. 268–296 (Jul. 1996).

Guth, Rob: "JavaOne: Sun to Expand Java Distributed Computing Effort", "http://www.sunworld.com/swol–02–1998/swol–02–sunspots.html," XP–002109935, p. 1, Feb. 20, 1998.

Hartman, J., Manber, U., et al., Liquid Software: A new paradigm for networked systems, Technical Report 96–11, Department of Comp. Sci., Univ. of Arizona, 6/96.

Hunt, N., "IDF: A Graphical Data Flow Programming Language for Image Processing and Computer Vision", Proceedings of the International Conference on Systems, Man, and Cybernetics, Los Angeles, Nov. 4–7, pp. 351–360, (1990).

IBM: "Chapter 6—Distributed SOM (DSOM)" SOMObjects Developer Toolkit Users Guide, Version 2.1, Oct. 1994 (1994–10), pp. 6–1–6–90.

Jones, Richard, et al., "Garbage Collection: Algorithms for Automatic Dynamic Memory Management," pp. 165–175, John Wiley & Sons, 1996.

Kay, Michael H. et al., "An Overview of the Raleigh Object–Oriented Database System", ICL Technical Journal, vol. 7, No. 4, pp. 780–798, (Nov. 1991), Oxford, GB.

Kougiouris et al., "Support for Space Efficient Object Invocation in Spring"; (Sep. 1994).

Lindholm et al., "The Java (TM) Virtual Machine Specification", Addison Wesley, 1996.

Mitchell et al.; "An Overview of the Spring System"; (Feb. 1994).

Orfali R. et al., "The Essential Distributed Objects Survival Guide," Chapter 11: Corba Commercial ORBs, pp. 203–215, John Wiley & Sons, Inc., (1996).

Riggs Roger et al., "Pickling State in the Java (TM) System," USENIX Association Conference on Object–Oriented Technologies and Systems, XP–002112719, Jun. 17–21, 1996, pp. 241–250.

Rosenberry et al., "Understanding DCE"; Chapters 1–3, 6; (1992).

Waldo J et al: "Events in an RPC based distributed system" Proceedings of the 1995 USENIX Technical Conference, Proceedings USENIX Winter 1995 Technical Conference, New Orleans, LA. USA, Jan. 16–20, 1995, pp. 131–142.

Wilson, P.R., et al., "Design of the Opportunistic Garbage Collector," Proceedings of the Object Oriented Programming Systems Languages And Applications Conference, New Orleans, vol. 24, No. 10, Oct. 1989.

Wu, Xuequn, "A Type system for an Object–Oriented Database System," Proceedings of the International Computer Software and Applications Conference (COMPSAC), pp. 333–338, Sep. 11–13, 1991, Tokyo, Japan.

Yemini, Y. and S. da silva, "Towards Programmable Networks", IFIP/IEEE International Workshop on Distributed Systems: Operations and Management, L'Aquila, Italy, 10/96.

* cited by examiner

METHOD AND SYSTEM FOR DETERMINISTIC HASHES TO IDENTIFY REMOTE METHODS

RELATED APPLICATIONS

This application is a continuation of application Ser. No. 09/045,652, now U.S. Pat. No. 6,134,603, filed Mar. 20, 1998, which is incorporated herein by reference.

The following identified U.S. patent applications are relied upon and are incorporated by reference in this application.

Provisional U.S. patent application Ser. No. 60/076,048, entitled "Distributed Computing System," filed on Feb. 26, 1998.

U.S. patent application Ser. No. 09/044/923, entitled "Method and System for Leasing Storage," and filed on the same date herewith.

U.S. patent application Ser. No. 09/044,838, entitled "Method, Apparatus, and Product for Leasing of Delegation Certificates in a Distributed System," and filed on the same date herewith.

U.S. patent application Ser. No. 09/044,834, entitled "Method, Apparatus and Product for Leasing of Group Membership in a Distributed System," and filed on the same date herewith.

U.S. patent application Ser. No. 09/044,916, entitled "Leasing for Failure Detection," and filed on the same date herewith.

U.S. patent application Ser. No. 09/044,933, entitled "Method for Transporting Behavior in Event Based System," and filed on the same date herewith.

U.S. patent application Ser. No. 09/044,919, entitled "Deferred Reconstruction of Objects and Remote Loading for Event Notification in a Distributed System," and filed on the same date herewith.

U.S. patent application Ser. No. 09/044,938, entitled "Methods and Apparatus for Remote Method Invocation," and filed on the same date herewith.

U.S. patent application Ser. No. 09/044,790, entitled "Method and Apparatus for Determining Status of Remote Objects in a Distributed System," and filed on the same date herewith.

U.S. patent application Ser. No. 09/044,930, entitled "Downloadable Smart Proxies for Performing Processing Associated with a Remote Procedure Call in a Distributed System," and filed on the same date herewith.

U.S. patent application Ser. No. 09/044,917, entitled "Suspension and Continuation of Remote Methods," and filed on the same date herewith.

U.S. patent application Ser. No. 09/044,835, entitled "Method and System for Multi-Entry and Multi-Template Matching in a Database," and filed on the same date herewith.

U.S. patent application Ser. No. 09/044,839, entitled "Method and System for In-Place Modifications in a Database," and filed on the same date herewith.

U.S. patent application Ser. No. 09/044,945, entitled "Method and System for Typesafe Attribute Matching in a Database," and filed on the same date herewith.

U.S. patent application Ser. No. 09/044,931, entitled "Dynamic Lookup Service in a Distributed System," and filed on the same date herewith.

U.S. patent application Ser. No. 09/044,939, entitled "Apparatus and Method for Providing Downloadable Code for Use in Communicating with a Device in a Distributed System," and filed on the same date herewith.

U.S. patent application Ser. No. 09/044,826, entitled "Method and System for Facilitating Access to a Lookup Service," and filed on the same date herewith.

U.S. patent application Ser. No. 09/044,932, entitled "Apparatus and Method for Dynamically Verifying Information in a Distributed System," and filed on the same date herewith.

U.S. patent application Ser. No. 09/044,840, entitled "Method and Apparatus for Dynamic Distributed Computing Over a Network," and filed on Feb. 26, 1998.

U.S. patent application Ser. No. 09/044,938, entitled "An Interactive Design Tool for Persistent Shared Memory Spaces," and filed on the same date herewith.

U.S. patent application Ser. No. 09/044,934, entitled "Polymorphic Token-Based Control," and filed on the same date herewith.

U.S. patent application Ser. No. 09/044,915, entitled "Stack-Based Access Control," and filed on the same date herewith.

U.S. patent application Ser. No. 09/044,944, entitled "Stack-Based Security Requirements," and filed on the same date herewith.

U.S. patent application Ser. No. 09/044,837, entitled "Per-Method Designation of Security Requirements," and filed on the same date herewith.

BACKGROUND

A. Field of the Invention

This invention relates to data processing systems, and more particularly to remote method invocations on remote servers. Even more specifically, this invention relates to a method and system for identifying remote methods on a server machine using hash values.

B. Related Art

Distributed systems typically comprise multiple machines, such as computers and related peripheral devices, connected in a network, for example, a Local Area Networks (LAN), Wide Area Network (WAN), or the Internet. Distributed systems generally require that computational entities (e.g., applications, programs, applets, etc.) running in different address spaces, potentially on different machines, be able to communicate.

For a basic communication mechanism, distributed object oriented systems utilize a Remote Procedure Call (RPC) mechanism referred to as Remote Method Invocation (RMI). RMI facilitates application-level communication between "objects" residing in different address spaces. In object oriented systems, a "class" provides a template for the creation of "objects" (which represent items or instances manipulated by the system) having characteristics of that class. The term template denotes that the objects (i.e., data items) in each class, share certain characteristics or attributes determined by the class such as its methods. Objects are typically created dynamically during system operation. Methods associated with a class are generally invoked (i.e., caused to operate) on the objects of the same class. RMI is the action of invoking a method of a remote object. In response to the invocation of a method of a remote object using RMI, a lower level communications process causes the invoked method to be executed on the remote object.

The Java™ runtime system, which is designed to implement applications written in the Java™ object oriented programming language, supports a specific Java™ RMI Application Program Interface (API). This API is explained in, for example, a document entitled "Remote Method Invocation Specification," Sun Microsystems, Inc. (1997), which is available via universal resource locator(URL) http://www javasoft.com/products/jdk/1.1/docs/guide/rmi/spec/rmiTOC.doc.html, and is incorporated herein by reference. The Java™ language is described in many texts, including one that is entitled "The Java Language Specification" by James Gosling, Bill Joy, and Guy Steele, Addison-Wesley, 1996. Java and all Java-based trademarks are trademarks or registered trademarks of Sun Microsystems, Inc. in the United States and other countries.

Java RMI assumes a homogeneous environment of the specialized Java runtime system, and therefore Java RMI takes advantage of a specialized object model for the Java language whenever possible. In the Java™ distributed object model, a remote object is one that has methods that can be invoked from another runtime system, potentially on a different machine. An object of this type is described by one or more remote interfaces code written in the Java language that specify the methods of the remote object.

The Java runtime system keeps track of all remote objects referenced by computational entities executing through a local virtual machine (VM). The Java™ VM (JVM) is an abstract computing machine of the runtime system that receives instructions from programs in the form of bytecodes and that interprets these bytecodes by dynamically converting them into a form for execution, such as object code, and executing them. The JVM is described in detail in a text entitled "The Java Virtual Machine Specification", by Tim Lindholm and Frank Yellin, Addison Wesley, 1996.

In Java RMI, a client, while processing a program, can remotely initiate processing by a server computer of methods in connection with certain "parameter" information provided by the client. After the server has processed the procedure, it will provide results of its processing to the client, which the client may thereafter use in its processing operations. Typically in such RMI calls, the client will make use of a local "stub" which, when called, transfers the request to the server which implements the particular method, obtains the results and provides them back to the client.

Conventionally, when a client calls a method on a remote object containing a list of methods, the method is identified by a string name or a sequence number identifying the selected method. However, identifying a method by its string name can create false identification of a remote method because the remote object may have more than one -method with the same string name. Such methods are said to be "overloaded." Although methods may have the same string name, overloaded methods with duplicate same string names typically take different parameter types. For instance, suppose a remote object, using the Java programming language, has the following two methods:

```
public interface Directory {
    PhoneNumber lookupPhone(String name);
    PhoneNumber lookupPhone(Person person)
}
```

If a client seeks to invoke one of these two methods, the string name "lookupPhone" alone does not enable the remote object to determine the correct method to be invoked because more than one method with that name exist.

Another conventional approach for identifying a remote method is to put the methods in alphabetical order and number them. Suppose a remote object implements the following two methods:

```
public interface Directory {
    PhoneNumber lookupPhone(String name);
    void storePhone(String name, PhoneNumber phone);
}
```

The numbering of the methods may be represented as follows:

1. lookupPhone
2. storePhone

When a client wants to invoke a method, it simply sends the number corresponding to the method in the method invocation instruction. If, however, new methods are added to the remote object such that it appears as follows:

```
public interface Directory {
    PhoneNumber lookupPhone(String name);
    void storePhone(String name, PhoneNumber phone);
    Address lookupAddress(String name);
    void storeAddress(String name, Address addr);
}
``` the new numbering of the methods would be:

1. lookupAddress
2. lookupPhone
3. storeAddress
4. storePhone

Hence, the numbers corresponding to each method have changed. Thus, existing clients that continue to use old stubs using the old numbering would invoke the wrong methods.

Accordingly, it is desirable to provide a system that uniquely identifies the methods of remote objects for RMI.

SUMMARY

The present invention satisfies this and other desires by providing a method and system for identifying the methods of remote objects using hash values.

A method in a data processing system for invoking a remote methods comprises the steps of providing a hash value uniquely identifying a remote method, sending the hash value in response to an instruction to invoke the remote method, and invoking the remote method based on the hash value. The method further includes the step of locating the remote method in a mapping table using the hash value.

Apparatus and systems are also provided for carrying out methods consistent with the present invention.

The advantages accruing to the present invention are numerous. For example, methods and systems consistent with the present invention identify unique remote methods for invocation, thus avoiding false identification of incorrect remote methods. Furthermore, this identification can be performed even if two or more methods have the same string name, or the methods use a changing numbering system.

Although a long string such as the method name combined with a parameter type list could be used to more precisely identify a remote method, such an identifier would be cumbersome. The use of hash values further creates greater efficiency by eliminating the need for long strings to more precisely identify remote methods. Additionally, it allows the server to perform more efficiently because the server can more efficiently manipulate and compute the integer numbers than the strings.

It is therefore, desirable to provide a method and apparatus to uniquely identify remote methods using hash values.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Overview

Figure 1:
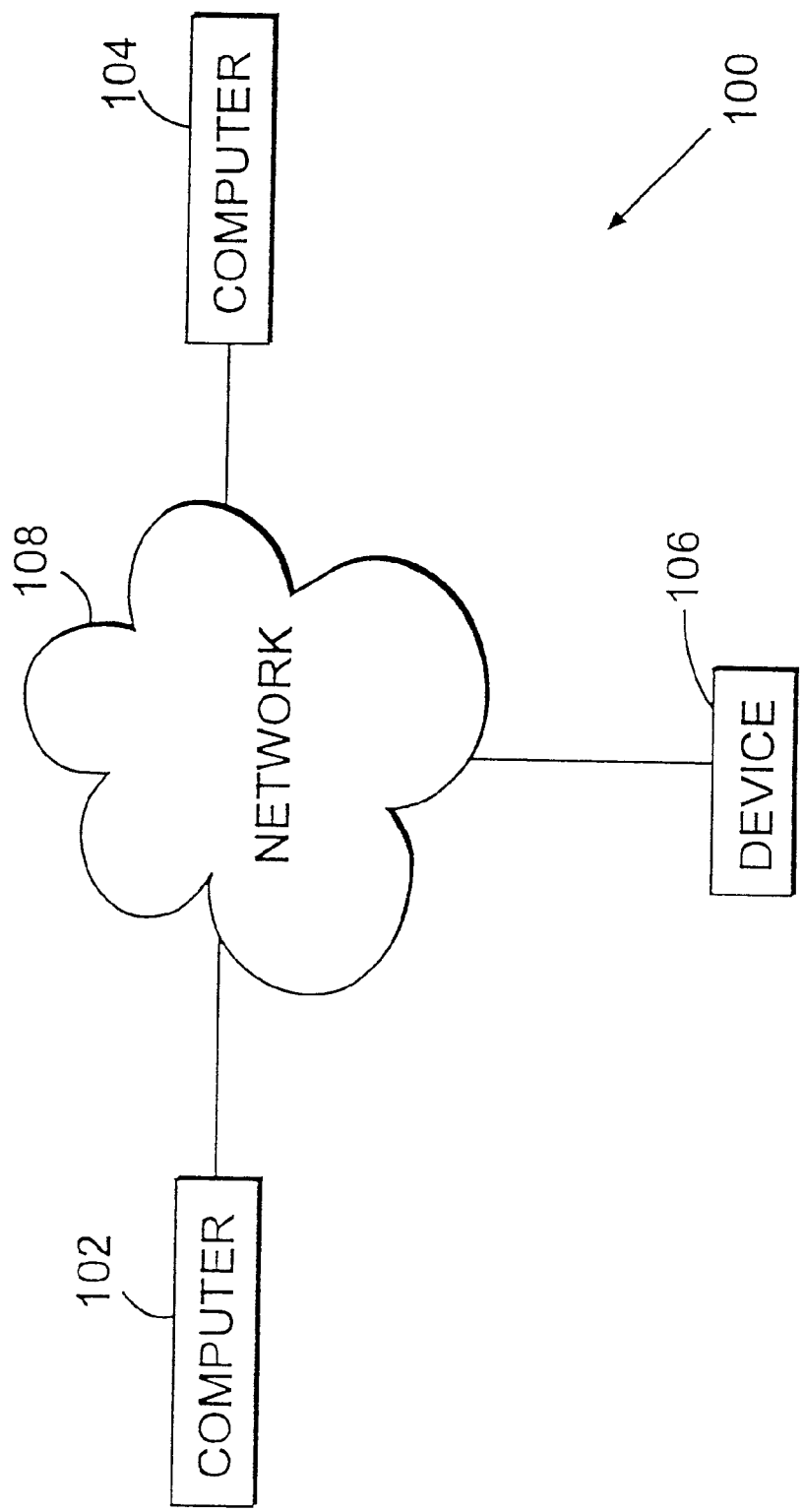
FIG. 1 illustrates a network in which systems consistent with the present invention may be implemented.

Methods and systems consistent with the present invention identify a method of a remote object using a hash value. When a client wishes to invoke a method of a remote object located on a server, the client sends the hash value identifying the particular remote method to the server over the RMI connection. In one implementation, this hash value is created by applying a hash function to the method string name and the parameter type list. Known hash functions with low collision rates can be used for this purpose.

When the server receives the method invocation, the server identifies the called method using the received hash value. The server maintains a mapping of hash values to their associated remote methods located on the server and references the correct method using the hash value.

The server creates the mapping table dynamically when a remote object is created. Upon the creation of a remote object, hash values are determined for each method implemented by the remote object. The server then adds these hash values and pointers to their corresponding methods to the mapping table. When adding the hash value and method pointer, the server checks the mapping table to verify that the pairing is unique, i.e., the server checks for a hash value collision. This process allows remote methods to be identified uniquely and allows the server to continually add methods over time, as the remote class evolves, without notifying all clients with old stubs of the new methods. Additionally, it allows clients using old stubs to correctly identify remote methods on the server. Even further, the use of hashes avoids the need for long strings to identify remote methods.

The Distributed System

Methods and systems consistent with the present invention operate in a distributed system ("the exemplary distributed system") with various components, including both hardware and software. The exemplary distributed system (1) allows users of the system to share services and resources over a network of many devices; (2) provides programmers with tools and programming patterns that allow development of robust, secured distributed systems; and (3) simplifies the task of administering the distributed system. To accomplish these goals, the exemplary distributed system utilizes the Java™ programming environment to allow both code and data to be moved from device to device in a seamless manner. Accordingly, the exemplary distributed system is layered on top of the Java programming environment and exploits the characteristics of this environment, including the security offered by it and the strong typing provided by it. The Java programming environment is more clearly described in Jaworski, *Java 1.1 Developer's Guide*, Sams.net (1997), which is incorporated herein by reference.

In the exemplary distributed system, different computers and devices are federated into what appears to the user to be a single system. By appearing as a single system, the exemplary distributed system provides the simplicity of access and the power of sharing that can be provided by a single system without giving up the flexibility and personalized response of a personal computer or workstation. The exemplary distributed system may contain thousands of devices operated by users who are geographically disperse, but who agree oh basic notions of trust, administration, and policy.

Within the exemplary distributed system are various logical groupings of services provided by one or more devices, and each such logical grouping is known as a Djinn. A "service" refers to a resource, data, or functionality that can be accessed by a user, program, device, or another service and that can be computational, storage related, communication related, or related to providing access to another user. Examples of services provided as part of a Djinn include devices, such as printers, displays, and disks; software, such as applications or utilities; information, such as databases and files; and users of the system.

Both users and devices may join a Djinn. When joining a Djinn, the user or device adds zero or more services to the Djinn and may access, subject to security constraints, any one of the services it contains. Thus, devices and users federate into a Djinn to share access to its services. The services of the Djinn appear programmatically as objects of the Java programming environment, which may include other objects, software components written in different programming languages, or hardware devices. A service has an interface defining the operations that can be requested of that service, and the type of the service determines the interfaces that make up that service.

Figure 2:
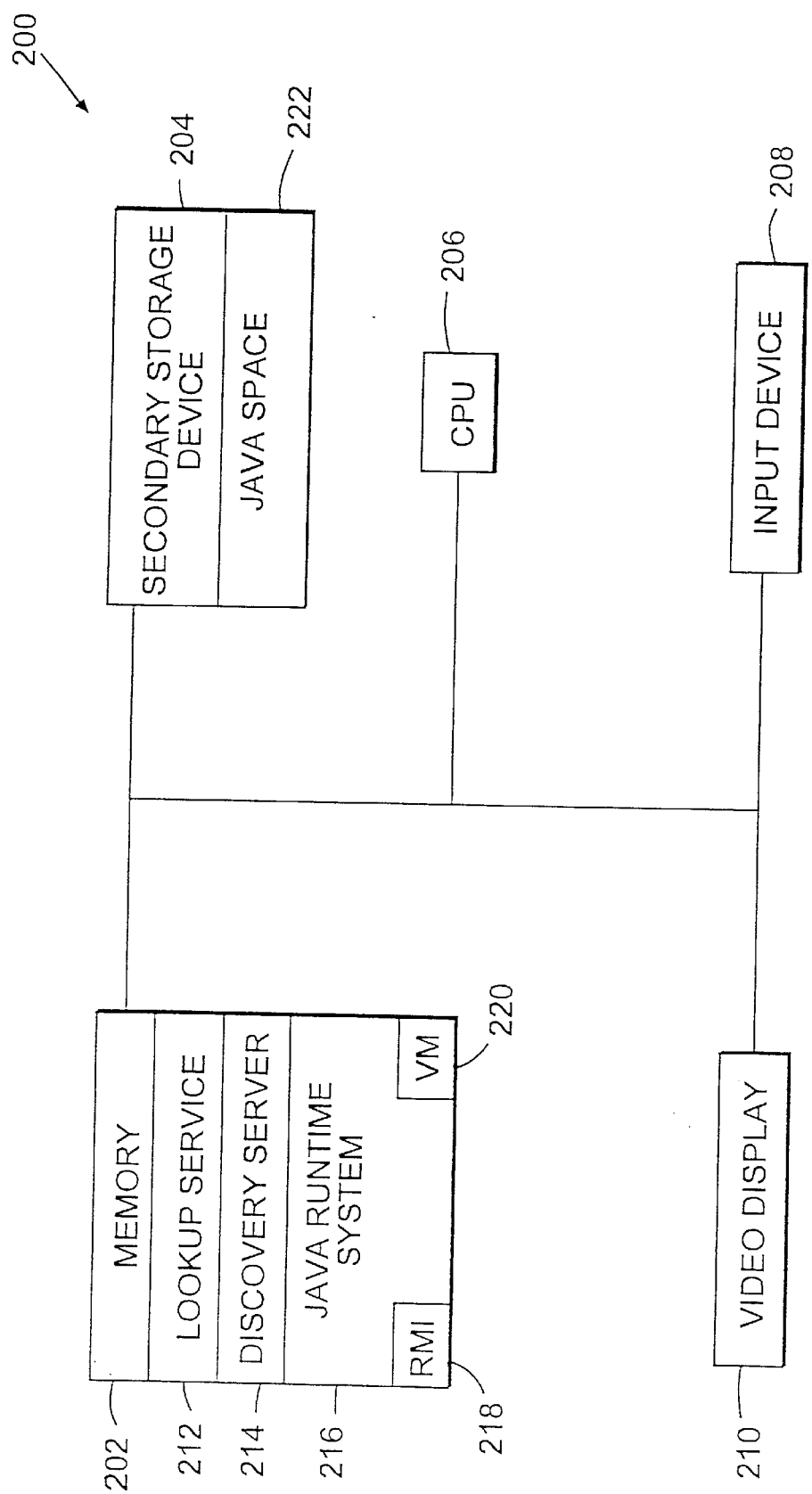
FIG. 2 is block diagram of the system architecture for a computer system with which the present invention may be implemented.

FIG. 1 depicts the exemplary distributed system 100 containing a computer 102, a computer 104, and a device 106 interconnected by a network 108. The device 106 may be any of a number of devices, such as a printer, fax machine, storage device, computer, or other devices. The network 108 may be a local area network, wide area network, or the Internet. Although only two computers and one device are depicted as comprising the exemplary distributed system 100, one skilled in the art will appreciate that the exemplary distributed system 100 may include additional computers or FIG. 2 depicts the computer 102 in greater detail to show a number of the software components of the exemplary distributed system 100. One skilled in the art will appreciate that computer 104 or device 106 may be similarly configured. Computer 102 includes a memory 202, a secondary storage device 204, a central processing unit (CPU) 206, an input device 208, and a video display 210. The memory 202 includes a lookup service 212, a discovery server 214, and a Java™ runtime system 216. The Java runtime system 216 includes the Java™ remote method invocation system (RMI) 218 and a Java™ virtual machine 220. The secondary storage device 204 includes a Java™ space 222.

As mentioned above, the exemplary distributed system 100 is based on the Java programming environment and thus makes use of the Java runtime system 216. The Java runtime system 216 includes the Java™ API, allowing programs running on top of the Java runtime system to access, in a platform-independent manner, various system functions, including windowing capabilities and networking capabilities of the host operating system. Since the Java API provides a single common API across all operating systems to which the Java runtime system 216 is ported, the programs running on top of a Java runtime system run in a platform-independent manner, regardless of the operating system or hardware configuration of the host platform. The Java runtime system 216 is provided as part of the Java™ software development kit available from Sun Microsystems of Mountain View, Calif.

The Java virtual machine 220 also facilitates platform independence. The Java virtual machine 220 acts like an abstract computing machine, receiving instructions from programs in the form of byte codes and interpreting these byte codes by dynamically converting them into a form for execution, such as object code, and executing them. RMI 218 facilitates remote method invocation by allowing objects executing on one computer or device to invoke methods of an object on another computer or device. Both RMI and the Java virtual machine are also provided as part of the Java software development kit.

The lookup service 212 defines the services that are available for a particular Djinn. That is, there may be more than one Djinn and, consequently, more than one lookup service within the exemplary distributed system 100. The lookup service 212 contains one object for each service within the Djinn, and each object contains various methods that facilitate access to the corresponding service. The lookup service 212 and its access are described in greater detail in co-pending U.S. patent application Ser. No. 09/044,939, entitled "Method and System for Facilitating Access to a Lookup Service," which has previously been incorporated by reference.

The discovery server 214 detects when a new device is added to the exemplary distributed system 100, during a process known as boot and join or discovery, and when such a new device is detected, the discovery server passes a reference to the lookup service 212 to the new device, so that the new device may register its services with the lookup service and become a member of the Djinn. After registration, the new device becomes a member of the Djinn, and as a result, it may access all the services contained in the lookup service 212. The process of boot and join is described in greater detail in co-pending U.S. patent application Ser. No. 09/044,826, entitled "Apparatus and Method for providing Downloadable Code for Use in Communicating with a Device in a Distributed System," which has previously been incorporated by reference. The Java space 222 is, an object repository used by programs within the exemplary distributed system 100 to store objects. Programs use the Java space 222 to store objects persistently as well as to make them accessible to other devices within the exemplary distributed system. Java spaces are described in greater detail in co-pending U.S. patent application Ser. No. 08/971,529, entitled "Database System Employing Polymorphic Entry and Entry Matching," assigned to a common assignee, filed on Nov. 17, 1997, which is incorporated herein by reference. One skilled in the art will appreciate that the exemplary distributed system 100 may contain many lookup services, discovery servers, and Java spaces.

Although systems and methods consistent with the present invention are described as operating in the exemplary distributed system and the Java programming environment, one skilled in the art will appreciate that the present invention can be practiced in other systems and other al programming environments. Additionally, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Sun, Sun Microsystems, the SunLogo, Java, and Java-based trademarks are trademarks or registered trademarks of Sun Microsystems Inc. in the United States and other countries.

Identifying Remote Methods Using Hashes

Figure 3:
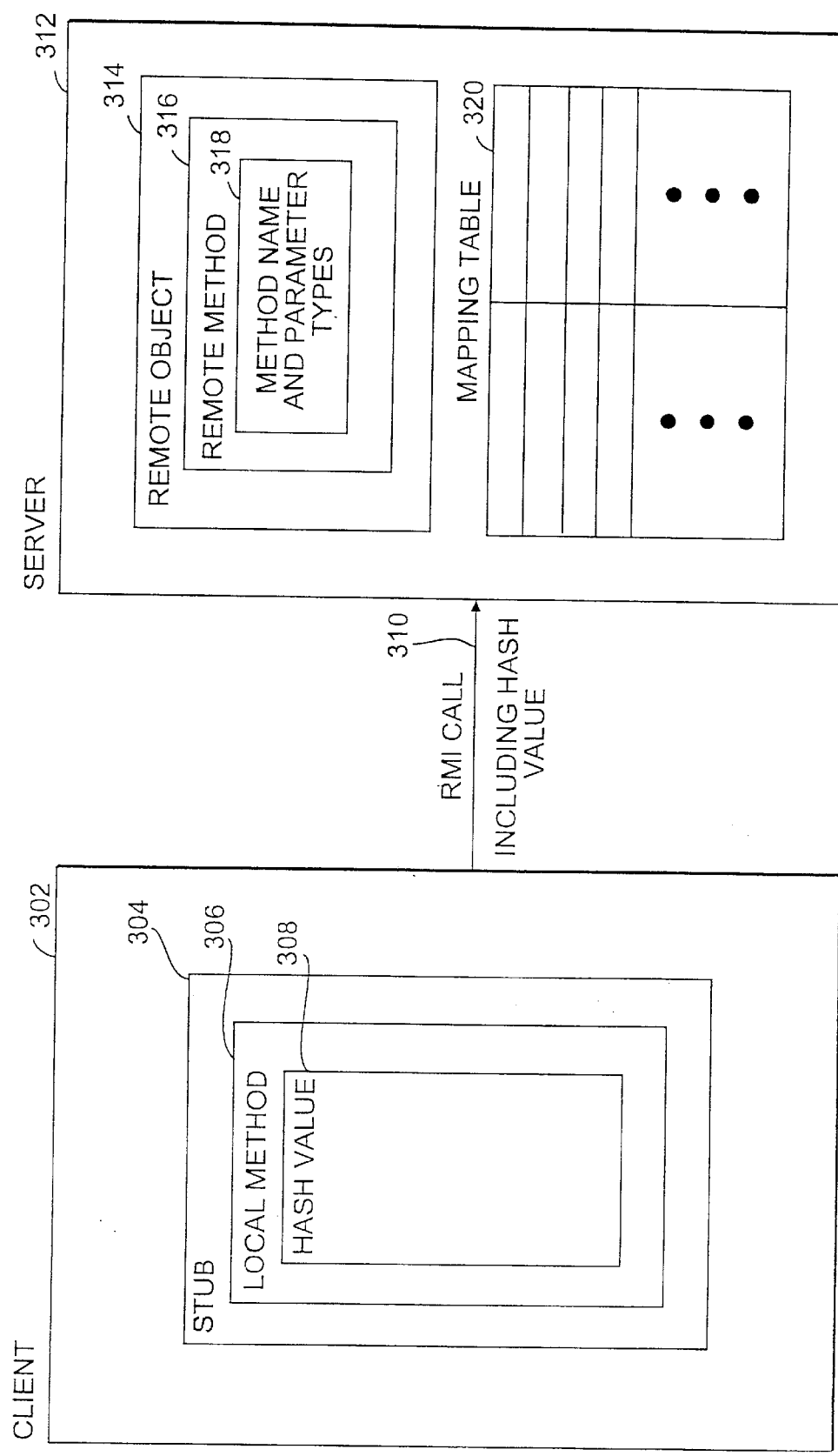
FIG. 3 is a block diagram illustrating an RMI call using a hash value between a client computer and a server computer consistent with the present invention.

FIG. 3 is a block diagram illustrating an RMI call using a hash value consistent with the present invention. It also shows two computers, client 302 and server 312, which may correspond to computers 102 and 104 shown in distributed system 100. The invocation of a method on a remote object is implemented using Java RMJ, although other RMI mechanisms may be used. When client 302 wishes to access a method implemented by a remote object 314 on a server 312, client 302 uses a stub 304 referencing remote object 314. Stub 304 is typically downloaded from server 312 but can also be local to the client 302 or downloaded from somewhere else in network 100, including another server. The manner in which the client obtains a stub is described in greater detail in copending U.S. patent application Ser. No. 08/636,706, entitled, "System and Method For Facilitating Dynamic Loading of 'Stub' Information to Enable a program Operating in One Address Space to Invoke Processing of a Remote Method or Procedure in Another Address Space", herein incorporated by reference. Additionally, a "stubless" implementation may be employed in a manner consistent with U.S. patent application Ser. No. 09/044,938, entitled "Methods and Apparatus for Remote Method Invocation", which was previously incorporated by reference.

Stub 304, which references remote object 314, has a local method 306 for each remote method, such as remote method 316, implemented by remote object 314. This local method 306 is implemented by the client to invoke the corresponding method 316. It performs functions, such as initiating the communication link between the client and remote method 316 and sending the hash value identifying the method. It should be noted, however, that remote object 314 may have more than one method, although only one method 316 is shown in FIG. 3. Similarly, stub 304 may have more than one local method to implement remote methods, but only one is shown in FIG. 3 for simplicity.

In one implemention consistent with the present invention, local method 306 is created during the compiling of stub 304, which is created by server 312. When a user supplies a remote object 316 (in the form of Java source code) as a Java class, a Java compiler (not shown) on server 312 compiles the Java class, thus creating a binary class file.

This binary class file is compiled by a stub compiler (not shown) on server to create a stub class. Clients use instances of this stub class (i.e., a stub) to invoke methods of the remote object 316.

In this implementation, local method 306 is compiled into stub 304 during the process of compiling the stub. The stub compiler compiles hash value 308 into the local method. As a result, local method 306 has a hash value that identifies the corresponding method in the remote object referenced by the stub. For example, suppose a server has a remote method:

int insurancePremium (String state, int age)

Then the corresponding stub may have a local method implemented as follows:

```
int insurancePremium (String state, int age) {
    Stream out = startNewCall ( );
    sendLong (out, 4056878021019060934 . . . );
    sendString (out, state);
    sendInt (out, age);
    Stream in = finishCall (out);
    String result = readString (in);
    finishResults (in);
    return result;
}
``` where the long integer of the sendLong method call is a hash value uniquely identifying a remote method.

In one implementation, hash value 308 is a hash value resulting from applying a standard hash function to the combination of the method name and parameter type list 318 of the remote method 316, as follows:

Hash (Method Name, Parameter Type List)

This hash function returns a hash value that may be an integer. Both the method name and parameter type list are used to avoid collisions overwise caused by using only the method name alone. In a another implementation, the hash function may be applied to the method name, parameter type and return value type. In other implementations, however, the hash function may be applied to the method name alone where collisions are less likely.

In another implementation consistent with the present invention, the hash function applied to the method name and parameter type list is the hash function used by the "Secure Hash Algorithm 1" (SHA-1) secure hash standard. This standard is described in detail in the *Federal Information Processing Standard Publication* 180-1"Secure Hash Standard", and can also be found at http://csrc.nist.gov/fips on the Internet. The SHA-1 protocol is a hash function that produces a 160 bit hash value. In yet another implementation consistent with the present invention, the hash value used is only the first 64 bits of the SHA-1 hash value. In this implementation, the hash value 308 is represented by these 64 bits, a shorten version of the full SHA-1 hash value.

FIG. 3 also shows RMI call 310, which is used when client 302 sends a message to invoke a remote method on a remote server such as server 312. RMI call 310 further includes hash value 308. Upon receipt of RMI call 310, server 312 then uses the hash value 308 to reference mapping table 320 and identify a selected remote method.

Figure 4:
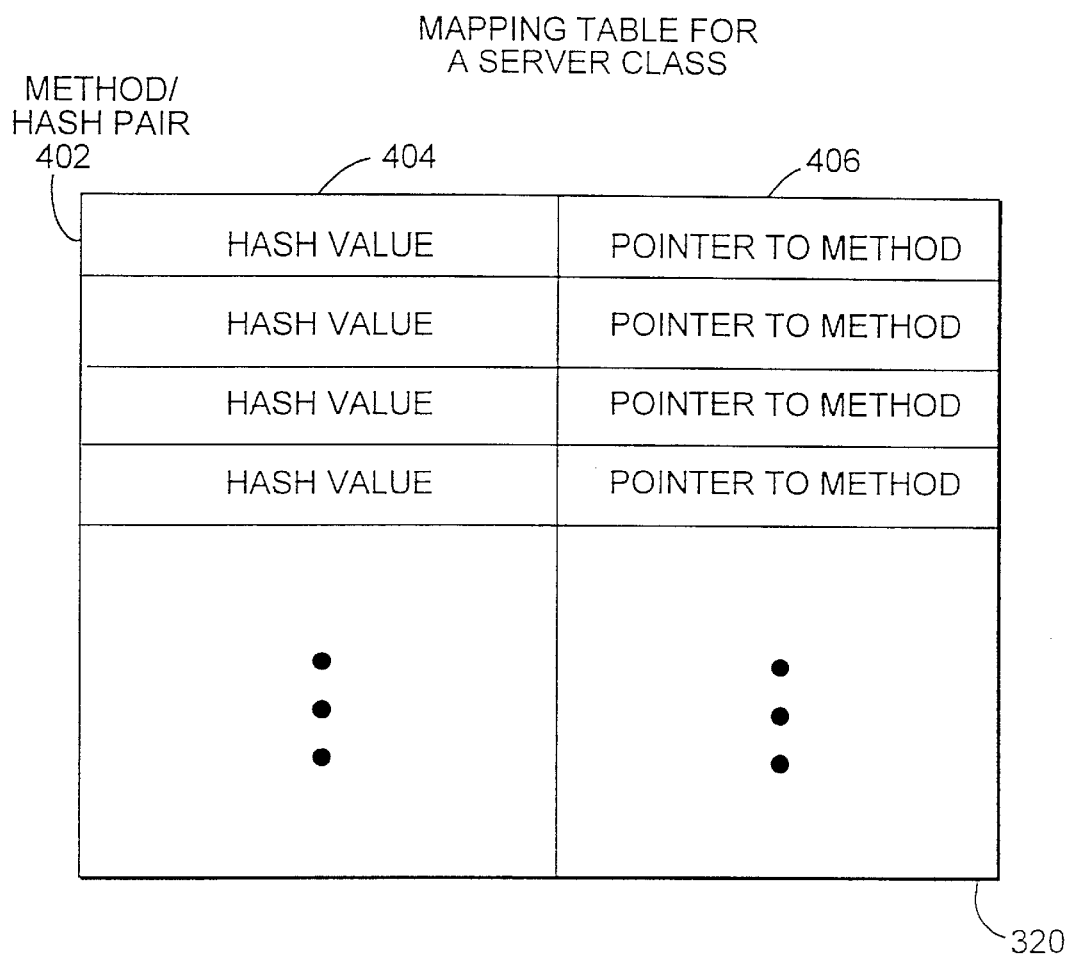
FIG. 4 is a block diagram of a hash value mapping table consistent with the present invention.

FIG. 4 further depicts details of mapping table 320 on server 312 consistent with the present invention. Generally, mapping table 320 represents the mapping of hash values to individual 5 remote methods of a remote object 314 on server 312. As such, mapping table 320 includes sets of pairings 402 of a hash value 404 and a pointer to a remote method 306. This pointer to a method is a "handle" that identifies a method in such a way as to allow it to be programmatically invoked through the handle. For example, in the Java programming language, this would be an instance of java.lang.reflect.Method. In C++, it would be a function pointer (i.e., the actual machine address of the code). As a result, each hash value 304 references a remote method 306.

(1) Identifying Remote Methods

Figure 5:
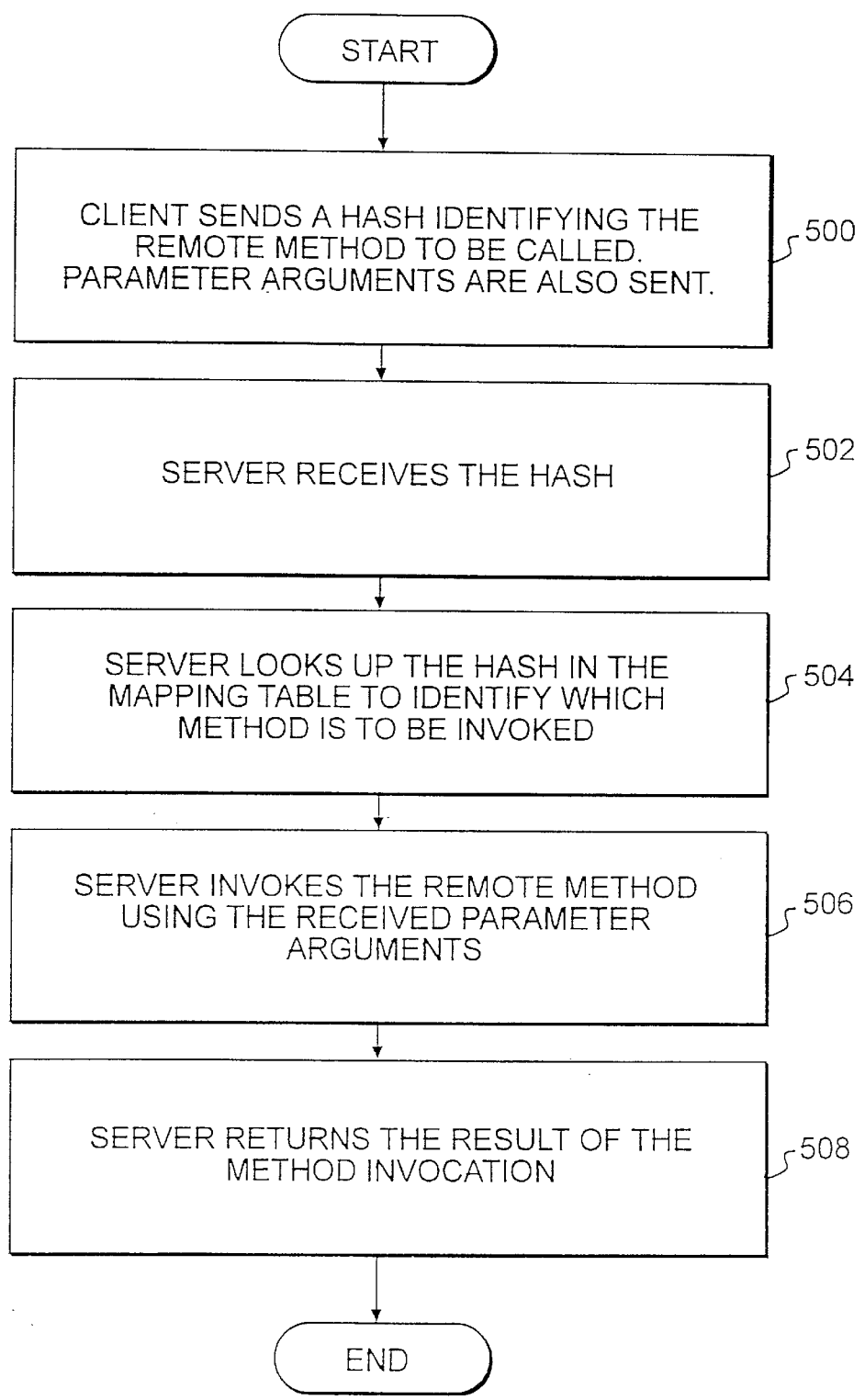
FIG. 5 is a flowchart illustrating the steps used to identify a unique remote method consistent with the present invention.

FIG. 5 illustrates the steps used in a method consistent with the present invention for identifying a unique remote method on a server by using hash values. First, client 302 makes an RMI call 310 to server 312 to remotely invoke a remote method 316 on server 312. In this RMI call 310, client 302 sends a hash value identifying remote method 316 to be invoked (step 500). In RMI call 310, the client 302 may also pass any parameter arguments to be used by the remote method 316 to invoke the method.

Next, server 312 receives hash value 308 included in RMI call 310 (step 502). Server 312 then accesses mapping table 320 for the server class of remote object 314 to identify which remote method is to be invoked (step 504). Upon accessing mapping table 320, server 312 uses hash value 308 sent in RMI call 310 to identify the remote method to be invoked in the mapping table.

At this point, server 312 invokes method 316 using the received parameter argument values in RMI call 310 (step 506). Finally, server 312 returns the result of the method invocation to client 302 (step 508).

For an example using these steps of a method consistent with the present invention, suppose a remote object implemented the following exemplary set of methods:

```
public interface Directory {
    PhoneNumber lookupPhone(String name);
    PhoneNumber lookupPhone(Person person);
    void storePhone(String name, PhoneNumber phone);
    void storePhone(Person person, PhoneNumber phone);
    Address lookupAddress(String name);
    Address lookupAddress(Person person);
    void storeAddress(String name, Address addr);
    void storeAddress(Person person, Address addr);
}
```

Because this list of remote methods includes methods with duplicate string names, accessing the list by method name may result in invocation of the wrong method. If, for instance, a client wished to invoke the first lookupPhone method listed in the example, the client would send an RMI call including the hash of the method name and parameter type list:

Hash (lookupPhone, String)

This process ensures that the second method, lookupPhone with the parameter Person, would not be invoked. In addition to this hash, the client also sends the argument for the parameter String (i.e., "John" to lookup the phone number for a person with the string name John.)

(2) Building the Mapping Table

Figure 6:
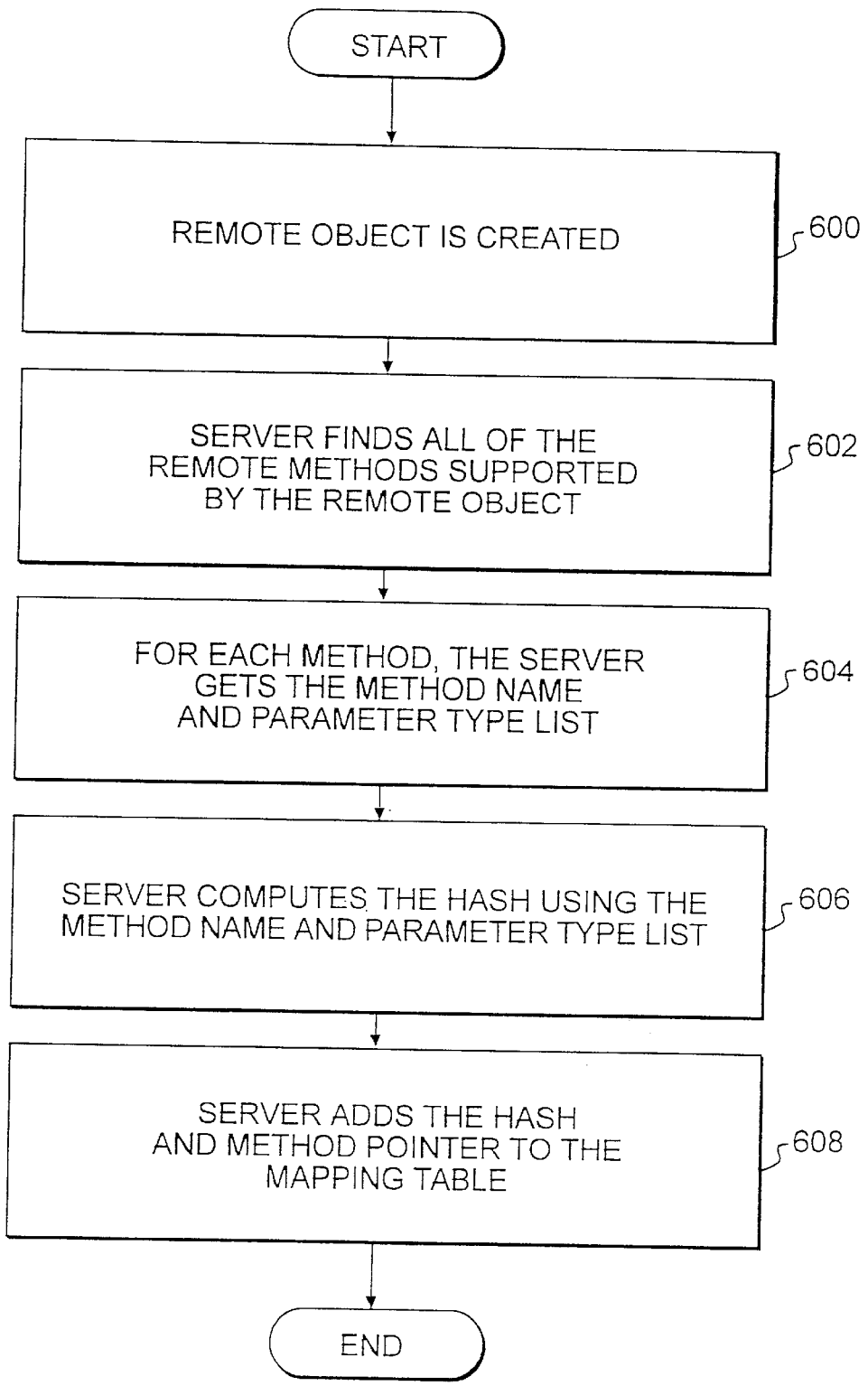
FIG. 6 is a flowchart illustrating the steps used by a server machine to create a hash value mapping table consistent with the present invention.

FIG. 6 depicts the steps used in methods consistent with the present invention by server 312 for dynamically building the mapping table 320 at run time. Generally, when a remote object is created, the Java runtime system on server 312 adds the hash values for each method of the remote object to the mapping table 320. As a result, server 312 has a mapping table for each remote class, since typically all remote objects of the same class have the same remote methods.

First, in methods consistent with the present invention, an object on server 312 is created as remote object, such as object 314 (step 600). Upon this creation, the Java runtime system on server 312 locates all remote methods 316 supported by object 314 (step. 602). The Java runtime system calculates the hash value for each remote method 316 of the remote object 314. In one implementation, it obtains the method name and parameter type list 318 (step 604) and computes the hash of the method name and parameter type list (step 606). The Java runtime system on server 312 adds the resulting hash value 404 and a pointer to the method 406 to mapping table 320 (step 608). When adding the hash value, the Java runtime system checks the mapping table to ensure that the hash value does not already exist in the mapping table, i.e., no collisions have occurred with respect to the hash values. Although hash functions virtually guarantee that a hash value will uniquely identify a remote method, checking the table verifies that there are no collisions of hash values.

To illustrate an example of the steps used in FIG. 6, suppose a remote object is created containing the following methods:

```
public interface Directory {
    Address lookupAddress(String name);
    Address lookupAddress(Person person)
}
```

The Java runtime system on server 312 creates a hash for each remote method. In this example, it creates two hashes:

Hash (lookupaddress, String), and

Hash (lookupAddress, Person).

Each hash value is unique and will be used to uniquely identify the remote method. Each hash value is added with a pointer to its corresponding method to mapping table 320, thus creating a method and hash value pairing 402 in mapping table 320. Server 312 can later access mapping table 320 using hash value 308 from client 302 to identify remote method 316 to be invoked.

The process of using hashes to identify remote methods on a remote server advantageously enables a client to uniquely identify the remote method without identifying an incorrect method Additionally, the use of hashes avoids the need for long strings to identify remote methods, thereby allowing more efficient processing. The false identification of remote methods on servers commonly results from remote methods having string names common to more than one method, or the changing of numbering of methods without notifying clients using an old stub of the number changes. Methods and systems consistent with the present invention using hashes to identify remote methods on a remote server avoid these and related problems.

It will be appreciated by those skilled in this art that various modifications and variations can be made to the remote method identification strategy consistent with the present invention described herein without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

What is claimed is:

1. A method for identifying an executable method, comprising the steps, performed by a processor, of:

creating a method identifier for the executable method as a function of a name associated with the executable method and a parameter for use in connection with the execution of the executable method;

sending the method identifier for the executable method to a device to invoke the executable method; and receiving a result indicating at least an attempt to initiate a process to invoke the executable method.

2. The method of claim 1, wherein the creating step includes the step of:

applying a hash function to the name associated with the executable method and the parameter of the local method.

3. A system for identifying an executable method, the system comprising: a processor for:

creating a method identifier for the executable method as a function of a name associated with the executable method and a parameter for use in connection with the execution of the executable method;

sending the method identifier for the executable method to a device to invoke the executable method; and receiving a result indicating at least an attempt to initiate a process to invoke the executable method.

4. A method in a data processing system for identifying a remote method on a server by a client, comprising the steps of:

generating an identifier based on a name of the remote method and a parameter of the remote method, the identifier uniquely identifying the remote method to be invoked by the client;

calling the server to remotely invoke the remote method on the server;

sending the generated identifier identifying the remote method to be invoked;

passing parameter argument values to be used in invoking the remote method;

receiving the call and the identifier by the server;

accessing a mapping table associated with a remote object associated with the remote method;

using the identifier sent with the call to identify the remote method to be invoked in the mapping table;

invoking the identified remote method using the passed parameter argument values; and returning a result of the invocation of the remote method to the client.

5. The method of claim 4, wherein the generating step further includes the step of:

applying a hash function to the name of the remote method and the parameter of the remote method to create the identifier.

6. A computer readable medium containing instructions to perform a method for invoking a remote method on a server, the method comprising the steps of:

generating an identifier based on a name of the remote method and a parameter of the remote method, the identifier uniquely identifying the remote method to be invoked by the client;

calling the server to remotely invoke the remote method on the server;

sending the generated identifier identifying the remote method to be invoked;

passing parameter argument values to be used in invoking the remote method;

receiving the call and the identifier;

accessing a mapping table associated with a remote object associated with the remote method;

using the identifier sent with the call to identify the remote method to be invoked in the mapping table;

invoking the identified remote method using the passed parameter argument values; and returning the result of the invocation of the remote method to the client.

7. The computer readable medium of claim 6, wherein the generating step further includes the step of:

applying a hash function to the name of the remote method and the parameter of the remote method to create the identifier.

8. A method for identifying a remote method on a server, the method comprising:

generating, at a client, an identifier as a function of a name of a local method and a parameter of the local method;

transmitting a call from the client to the server to invoke the local method, wherein the call comprises the generated identifier and parameter argument values for the local method;

receiving the call at the server;

accessing, at the server, a mapping table to identify, as a function of the received identifier, a remote method, corresponding to the local method, to be invoked;

invoking, at the server, the identified remote method based on the received parameter argument values; and returning a result of the invocation of the remote method from the server to the client.

9. The method of claim 8, wherein the generating step further includes the step of:

applying a hash function to the name of the local method and the parameter of the local method to create the identifier.

10. A computer readable medium containing instructions to perform a method for identifying a remote method on a server, the method comprising the steps of:

generating, at a client, an identifier as a function of a name of a local method and a parameter of the local method;

transmitting a call from the client to the server to invoke the local method, wherein the call comprises the generated identifier and parameter argument values for the local method;

receiving the call at the server;

accessing, at the server, a mapping table to identify, as a function of the received identifier, a remote method, corresponding to the local method, to be invoked;

invoking, at the server, the identified remote method based on the received parameter argument values; and returning a result of the invocation of the remote method from the server to the client.

11. The computer readable medium of claim 10, wherein the generating step further includes the step of:

applying a hash function to the name of the local method and the parameter of the local method to create the identifier.

12. A method for identifying executable methods in a distributed system comprised of a plurality of devices, the method comprising steps, performed by one of the devices, of:

receiving a method identifier for an executable method to be invoked, the method identifier having been derived from a function based on a name associated with the executable method and a parameter for use in connection with the execution of the executable method;

identifying the method to be invoked by using the method identifier;

initiating a process to invoke the identified method; and returning a result indicating at least an attempt to initiate a process to invoke the identified method.

13. A system for identifying a remote method, and in response, invoking the method, the system comprising:

a memory including:

a mapping table for mapping identifiers to methods, each method having a parameter, and each identifier being based on a name of one of the methods and a parameter associated with the method; and a processor for:

receiving a request to invoke a selected one of the methods, the request including an identifier;

accessing the mapping table to identify the selected method based on the included identifier;

invoking the identified method using passed parameter argument values; and returning a result of the invocation of the identified method.

14. A system for identifying executable methods in a distributed system comprised of a plurality of devices, the system comprising:

a processor for:

receiving a method identifier for an executable method to be invoked, the method identifier having been derived from a function based on a name associated with the executable method and a parameter for use in connection with the execution of the executable method;

identifying the method to be invoked by using the method identifier;

initiating a process to invoke the identified method; and returning a result indicating at least an attempt to initiate a process to invoke the identified method.

* * * * *